H. H. Low,
Sawing Shingles.
No. 2,774. Reissued Oct. 8, 1867.
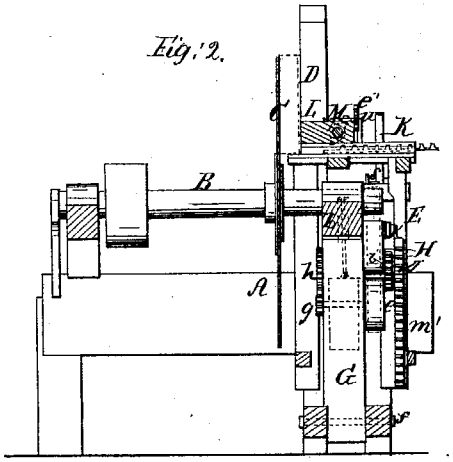
Fig. 2.
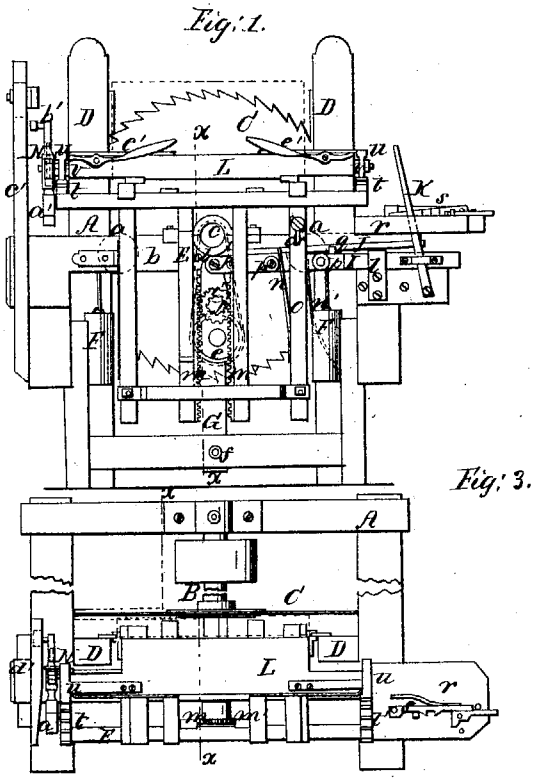
Fig. 1.
Fig. 3.
Witnesses:
James Crowley
J. W. Rooney
Inventor:
H. H. Low
AM. PHOTO-LITHO. CO. N.Y. (OSBORNE'S PROCESS)

United States Patent Office.

CHARLES S. BURT, OF DUNLEITH, ILLINOIS, ASSIGNEE OF HARRIET L. LOW, ADMINISTRATAIX OF H. H. LOW.

*Letters Patent No.* 23,692, *dated April* 19, 1859; *reissue No.* 2,774, *dated October* 8, 1867.

IMPROVEMENT IN SHINGLE MACHINES.

The Schedule referred to in these Letters Patent and making part of the same.

TO ALL WHOM IT MAY CONCERN:

Be it known that H. H. Low, of Galena, county of Jo Daviess, State of Illinois, now deceased, did invent in his lifetime a new and improved Shingle Machine, for which Letters Patent, No. 23,692, were granted to him on the 19th day of April, A. D. 1859; and I, CHARLES S. BURT, of Dunleith, Jo Daviess county, aforesaid, assignee in full of said invention and patent, do hereby declare the following to be a full, clear, and exact description thereof, in order to obtain a reissued patent of said invention, which will be more fully understood by reference to the accompanying drawings, which make a part of this specification, and in which—

Figure 1 is a front view of the invention.

Figure 2 is a vertical section of the same, taken along the line *x x*, figs. 1 and 3.

Figure 3 is a plan or top view of the same.

This invention relates to an improvement in that class of shingle machines in which a circular saw is used to cut the shingle from the bolt, and is an improvement on a sawing machine, for which Letters Patent bearing date March 16, 1858, were granted to the said H. H. Low. In the last-named patent no provision was made for operating the bolt-gate up to or down upon the saw, except by the pressure of the foot of the operator upon a treadle attached to the bolt-frame, or other equivalent means. That regularity and uniformity of feed which are so desirable in such cases, could not therefore be relied upon in such circumstances. To remedy such defect is the object of the present invention. Its accomplishment is attained through the instrumentality of a rack and pinion with the requisite accompaniments, which, when thrown properly into gear, will automatically operate the bolt-gate up to or down upon the saw with a uniform and constant movement.

To enable those skilled in the art to fully understand and construct this invention, I now proceed to describe it.

A represents a rectangular frame, which may be constructed in any proper way to support the working parts. B is a horizontal shaft, which is placed on the upper part of said frame, and having a circular saw, C, placed on it. D D are two uprights placed on the frame A, and having a sliding frame, E, fitted between them. The frame E is counterpoised between the uprights D D by the weights F F, the cords of which pass over pulleys *a a* in a cross-piece, *b*, of the frame A, as seen in fig. 1. On the end of the shaft B, adjoining the sliding frame E, a pulley, *c*, is placed, around which a belt, *d*, passes; said belt also passing around a pulley, *e*, which is attached to an upright swinging bar, G, the lower part of which is pivoted in the frame A, as shown at *f*, figs. 1 and 2. The shaft of the pulley *e* passes entirely through the bar G, and has a pinion, *g*, on its inner or back end; said pinion gearing into a wheel, *h*, the shaft of which also passes through bar G, and through an arm, H, adjoining the bar, and has two pinions *i* and *j* placed on it in immediate contiguity, the pinion *j* being smaller than *i*, as shown clearly in figs. 1 and 2. The upper end of the arm H is attached by a pivot, *k*, to a slide-bar, I, which is fitted in proper guides *l* at the outer side of the cross-piece *b*. In the frame E two vertical racks *m m'* are placed, one at each side of the pinions *i j*, (see fig. 1,) and at one side of said frame E two springs *n n'* are attached; said springs projecting outward in reverse positions from opposite sides of an upright, *o*, of frame E. On the slide-bar I two collars *p p* are placed, the use of which will be presently explained. A spring stop-bar, J, is attached to the outer side of the cross-pieces *b*, and has a pin, *q*, attached to it. To the outer end of the slide-bar I a lever, K, is attached, said lever passing through a slot in a board, *r*, on which a stop, *s*, is placed, (see figs. 1 and 3.) On the upper surface of the frame E two racks *t t'* are placed, one at each end, and between these two racks a carriage, L, is placed, and allowed to slide freely back and forth. To each end of the carriage L a spring-pawl, *u*, is attached, said pawls catching into the racks *t t'*. Longitudinally through the carriage L a shaft, M, passes; said shaft having a wiper, *v*, at each end of it, the two wipers being placed on the shaft at right angles to each other. To one side of the carriage L a lever, N, is attached, said lever having a weight, *a'*, at one end, and a friction-roller, *b'*, at the other. To the side of the frame A, and near the lever N, two uprights *c' c'* are attached, and to the upper parts of these uprights an adjustable block, *d'*, is attached, said block being over the lever N. To the outer side of the carriage L the two hand-levers *e e'* are attached, the outer ends of said levers being underneath the pawls *u u*, as shown clearly in fig. 1.

The operation is as follows: The bolt from which the shingles are cut (shown in red outline) is secured on the carriage L, and said carriage is properly adjusted on the frame E, so that the inner side of the bolt will be near the saw C. Motion is given to the shaft B in any proper way, and a vertical reciprocating motion is given to the frame E, through the medium of the bolt *d* and gearing *g h i j*, and racks *m m'*; the pinions *i j* being moved laterally backwards or forwards respectively at the termination of each movement of the frame up or down by means of projections *a*× on said frame forcing back the spring and stop J, and allowing the springs *n n'* to actuate the slide-bar I, the smaller pinion *i* gearing into the rack *m*, and moving the frame E downward. The shingles are sawed from the bolt as the frame E and bolt descend, and the bolt is presented obliquely to and fed toward the saw by means of the lever N and the shaft M with the wiper *v*; the shaft M being turned a certain distance each time the frame E reaches the termination of its upward stroke, in consequence of the lever N striking the block *d'*; the wipers *v*, in consequence of being placed on the shaft M in reverse positions, catching into the racks *t t'* alternately, and thereby actuating the ends of the carriage L alternately, and moving it towards the saw in such a manner that the shingles will be sawed in taper form from the bolt. The carriage may be moved back at any time by depressing the inner ends of the levers *e'*, and thereby raising the pawls *u u* free from the racks *t t'*.

From the above description it will be seen that a perfect automatic machine is obtained throughout. The length of the stroke of the frame E may be regulated by adjusting the upper projection *a*× at the upper part of the frame, as shown in fig. 1.

I do not claim a vertical reciprocating frame E supporting the bolt from which the shingles are sawed, as such a device is shown in the machine patented by H. H. Low in 1858 above referred to; the object of this invention being to provide for automatically working such a frame, especially in its downward movement. It is evident that after substituting the rack and pinion-work for the pressure of the foot of the operator in the manner above shown, the frame E may be raised by weights, as shown in Low's patent of 1858, instead of being elevated by rack and pinion-work, as herein contemplated. It is also evident that contrivances differing in form, but operating in principle like those above described, may be used for the purpose of working the rack and pinion which feed the bolt to the saw by a constant and uniform motion. I therefore do not intend to limit myself to the exact contrivances above described. But what I claim as new, and desire to secure by Letters Patent in the present application, is as follows:

1. In a shingle machine operated by means of a vertically reciprocating frame E which feeds a shingle-bolt to a circular saw, C, I claim the use of a rack and pinion, by which a constant and uniform feed motion is secured while the shingle is being sawed, substantially as described.

2. In a shingle machine such as is above contemplated, I claim the use of a rack and pinion for feeding uniformly the bolt to the saw, in combination with another rack and pinion by which the frame E is elevated preparatory to making a new cut, substantially in the manner above described.

3. In a sawing machine of the kind herein set forth, I claim the instrumentalities above described, or their fair equivalents for securing the automatic working of the machine, substantially as described.

CHARLES S. BURT.

Witnesses:
JOHN D. CLISE,
CHAS. A. BEEK.